Jan. 28, 1936.  A. C. BLEVINS  2,029,051
BOTTLE HOLDER
Filed June 30, 1933
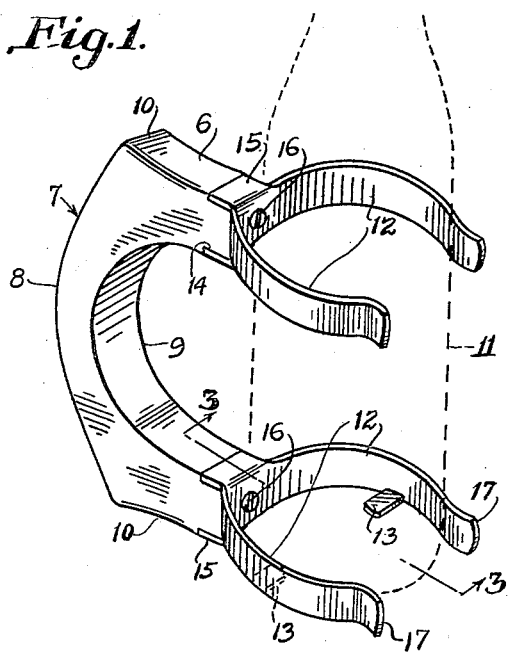
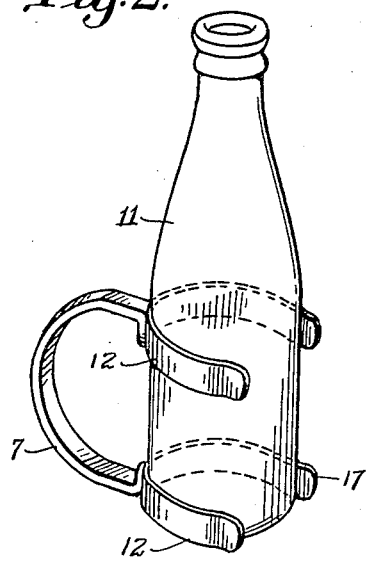
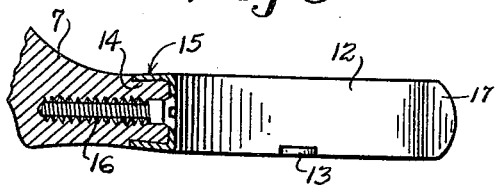
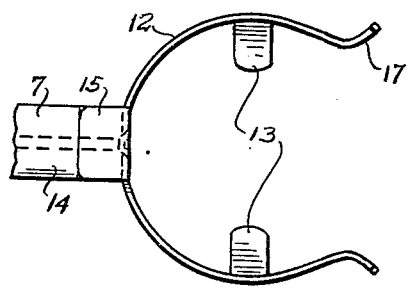
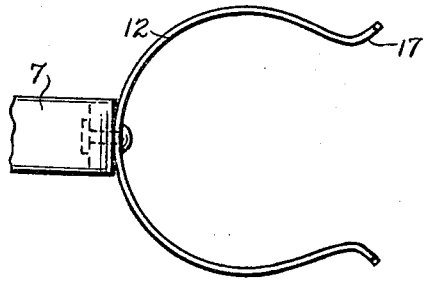
Inventor
ALBERT C. BLEVINS
By Mason Fenwick & Lawrence
Attorney Patented Jan. 28, 1936

2,029,051

UNITED STATES PATENT OFFICE 2,029,051

BOTTLE HOLDER

Albert C. Blevins, Dallas, Tex., assignor to Nu-Deal Handle Co., Dallas, Tex., a co-partnership composed of D. G. Blevins and L. M. Rosenthal Application June 30, 1933, Serial No. 678,537

1 Claim. (Cl. 215—100)

This invention relates to bottle holders; and more particularly, a holder in which the clamps are interchangeable to fit different sized bottles.

The principal object is to provide a handle with spring clips which due to their resiliency will accommodate a varied range of bottle sizes and will accommodate still another range by substituting different size clips. The prior art shows it old to use resilient clips, but these are usually made integral with the handle, and thus the utility of the device is limited. Further, the resilient clips of the prior art differ in structural detail which will be hereinafter pointed out.

Another object is to provide means whereby handles of different styles, shape and material, may be interchangeably used with the resilient clips.

Still another object is to provide a wide base for the bottle wherein the handle forms an additional support to prevent tipping of the bottle, and at the same time, readily permits the bottle being inserted and withdrawn from the holder.

Other objects and advantages will be disclosed in the specification and drawing forming a part of this application.

In the drawing:

Figure 1 is a perspective of the holder showing a bottle positioned in relation to the holder in dotted lines;

Figure 2 is a perspective of a modified form of a reversible holder, without the tabs;

Figure 3 is a vertical section partly broken away, taken on line 3—3 of Figure 1;

Figure 4 is a bottom plan with part of the handle broken away; and

Figure 5 is a bottom plan of the modified form shown in Figure 2.

Referring to the drawing, in which similar parts are designated by like numerals:

Numeral 6 designates a holder having a handle 7, an oval outer portion 8, and a cut-away inner portion 9 adapted to fit the hand. A shoulder 10 at both top and bottom provides a reversible support for a bottle 11 adapted to be gripped by resilient clips 12 and tabs 13. The outer ends 14 of the handle 7 are squared and recessed to receive angular socket members 15. Securing means in the form of screws 16 detachably secure the handle and clips together. The ends 17 of clips 12 flare outwardly to readily receive bottle 11.

The modified form of the holder, shown in Figures 2 and 5, has the same resilient clips 12 without the tabs 13 and with the handle 7 formed integral with the resilient clips. The handle 7 has shoulders 10 which extend above and below the clips 12, but in the same parallel plane. This permits the holder to be reversibly used in connection with a bottle and form a support therefor.

The invention as shown in the preferred form, Figures 1, 3, and 4, permits either the use of varying sizes of clips for different sized bottles, or different types of handles for the clips. Bottled drinks under the most favorable circumstances, are rather unsightly and when submerged in water for cooling, are very objectionable in that the hands and clothing may become wet during handling. Furthermore, due to the small base of the bottle and the elongated body, there is danger of the same tipping. In my invention, the bottle may be inserted into the holder 7, either from the side or the top, and will be gripped between the resilient clips 12 and supported by the tabs 13. By having the clips open and resilient, not only is the bottle securely supported, but the holder is adapted to receive varying sizes of bottles.

If it is desired to use a handle with milk bottles as contrasted with the ordinary pop bottle, slightly larger resilient clips may be substituted for the smaller, and attached to the handle, or a different style or color of handle may be added to the clips. Regardless of which way the handle 7 is secured to the resilient clips, there is afforded a support, since the support 10 occurs at both the top and bottom of the handle.

With this arrangement, not only does the user have all of the advantages of a holder for bottled drinks, but a broad base with a handle acting as a support which makes it extremely difficult to tip the same over.

Having thus described my invention in connection with the several illustrative embodiments thereof to the details of which I do not desire to be limited, variations being included which come within the scope of the claim appended hereto, what I claim is:

A bottle holder comprising a substantially U-shaped handle, resilient clips secured to the end of each leg of said handle, the outer edges of said clips being substantially coplanar with the outer surfaces of the legs of said handle, the ends of each leg being provided with recesses, and flanges extending from said clips into said recesses to facilitate assembling of said clips in proper position on said legs.

ALBERT C. BLEVINS.